United States Patent [19]

Shippey

[11] Patent Number: 4,636,051
[45] Date of Patent: Jan. 13, 1987

[54] AUTOMATIC FOCUSSING DEVICE

[75] Inventor: Geoffrey Shippey, Edinbungh, Scotland

[73] Assignee: Shandon Southern Products Limited, Great Britain

[21] Appl. No.: 723,611

[22] Filed: Apr. 15, 1985

[30] Foreign Application Priority Data

Apr. 16, 1984 [GB] United Kingdom ............... 8409855

[51] Int. Cl.$^4$ .................................................. G03B 3/00
[52] U.S. Cl. ...................................... 354/402; 354/406; 354/426
[58] Field of Search ............... 354/400, 402, 406, 407, 354/195.1, 426

[56] References Cited

U.S. PATENT DOCUMENTS

| 4,314,151 | 2/1982 | Suzuki et al. ...................... 354/402 |
| 4,349,254 | 9/1982 | Jyojiki et al. ...................... 354/406 |
| 4,458,145 | 7/1984 | Voles .................................... 354/402 |
| 4,459,002 | 7/1984 | Sakai et al. ......................... 354/402 |

Primary Examiner—Russell E. Adams
Attorney, Agent, or Firm—Vaden, Eickenroht, Thompson & Boulware

[57] ABSTRACT

An automatic focussing arrangement, incorporated in a system in which an optical image is focussed onto a plane, comprises a sensor assembly located in the region of the plane to sense the image. The sensor assembly comprises at least two arrays of sensor devices, one array of sensor devices being in front of the plane, and the second array of sensor devices being behind the plane. Means are provided for moving the image relative to the sensor assembly or for moving the sensor assembly relative to the image. From the first and second arrays signals are derived representative of the image received by the said sensor devices. A focus drive signal to maintain the focus of the arrangement as desired is derived from the signals.

13 Claims, 5 Drawing Figures

AUTOMATIC FOCUSSING DEVICE

BACKGROUND OF THE INVENTION

The present invention relates to an automatic focussing device and more particularly, although not exclusively, to an automatic focussing device suitable for use with an image analysis system, such as an image analysis system used to analyse the nature of cells present on a slide. Such a device may be used, for example, in a cervical cytolosy pre-screening cytolosy programme. Whilst such an arrangement will incorporate a microscope to be focussed, the invention may find applications in other devices which require optical focussing such as projectors, cameras and the like.

It has been proposed previously to provide an automatic focussing device for use in such an image analysis sytem. The device consisted of a beam splitter attachment for use with an appropriate microscope, the beamsplitter serving to split the image beam into three separate beams. Each part of the split beam is directed towards a respective image sensor. One sensor is located on the main focal plane of the relevant beam, and the other two sensors are located respectively just short of and just beyond the main focal plane of the respective beams.

A focus error signal is derived from the sensors which consists of a suitable non-linear function of illumination which favours dark/light transitions at the edges of the objects and within objects. This is integrated for each sensor over the same field of view, since at any instant the same image portion is directed towards the three sensors. This integral will be a maximum for a sensor on which an image is sharply focussed, and the value of the integral provided by two sensors which are equally out of focus will be the same. Consequently the focussing of the arrangement can be adjusted so that the value of the integral derived from the main sensor is at a maximum, and the value of the integrals obtained from the remaining two sensors is eual.

BRIEF SUMMARY OF THE INVENTION

According to this invention there is provided an automatic focussing arrangement, incorporated in a system in which an optical image is focussed onto a focus plane, comprising a sensor assembly located in the region of the focus plane to sense the image, the sensor assembly comprising at least two arrays of sensor devices, one array of sensor devices being in front of the focus plane, and the second array of sensor devices being behind the focus plane, means being provided for effecting relative movement between the image and the sensor assembly, so that the sensor assembly may be sequentially exposed directly to different parts of the image, means being provided for deriving from the first and second arrays signals representative of the image received by the said sensor devices, and for deriving, from signals generated from the first array when exposed to a predetermined part of the image, and from the second array when exposed to the same predetermined part of the image, a focus drive signal to maintain the focus of the arrangement as desired.

Thus, in the invention, the sensor assembly is sequentially exposed directly to different parts of the image, which means that each of the different parts of the image is sequentially exposed directly to the sensor assembly without passing through a beam splitter.

The invention may be used to focus a microscope ready for visual inspection of a slide by an operator. Preferably however the invention is used where the image is sensed by part of the system so that the system may perform at least a preliminary screening of the slides to be inspected. Thus, preferably a further array of sensor devices or some other sensor arrangement, such as a camera, is provided, which is located in a focus plane, to sense the focussed image.

In a preferred embodiment the arrays of sensor devices are all mounted on a single substrate which is tilted relative to said focus plane, the first and second arrays being located in regions of the substrate that are in front of and behind said focus plane respectively. The arrays may all form part of a single "chip" of arrays, or may be totally separate arrays mounted on said single substrate in the appropriate relative positions. Each array may comprise an array of charge coupled devices.

Preferably the arrays are elongate arrays and the relative movement between the sensor assembly and said image in said focus plane is in a direction transverse to the longitudinal axes of said arrays.

Conveniently the arrangement further comprises means for deriving a signal representative of the contrast of part of the image as viewed by the one of the first and second arrays, means for storing the information at least until such time that the other of the arrays respectively senses the same part of the image, and means for comparing the information from the said arrays to derive said focus drive signal.

In a preferred embodiment the first and second sensor arrays each consist of a plurality of sensing elements adapted to provide output signals representative of the levels of light intensity received by adjacent or next adjacent sensing elements, said deriving means including means to calculate the difference between signals from said first and second arrays to provide a signal representative of contrast.

Preferably all calculated differences less than a predetermined value are deemed to be zero, and all remaining differences have said predetermined value subtracted therefrom, the contrast representing signal being calculated as a function of the remaining value.

Advantageously an analog output signal from each of the first and second arrays is passed through an analog to digital converter to create a digital signal.

Preferably each digital signal is subjected to a logarithmic conversion process prior to said subtraction process. This serves to reduce the dependance of the calculated value on the incident illumination.

Conveniently each of the first and second sensor arrays comprises two staggered rows of light sensitive devices, signals from one of the rows of the said first array being processed and signals from the other of the rows of the second array being processed, thus enabling the same processing circuitry to be utilised for the first and second arrays.

BRIEF SUMMARY OF THE DRAWINGS

In order that the invention may be more readily understood, and so that further features thereof may be appreciated, the invention will now be described, by way of example, with reference to the accompanying drawings in which.

DETAILED DESCRIPTION OF INVENTION

Figure 1:
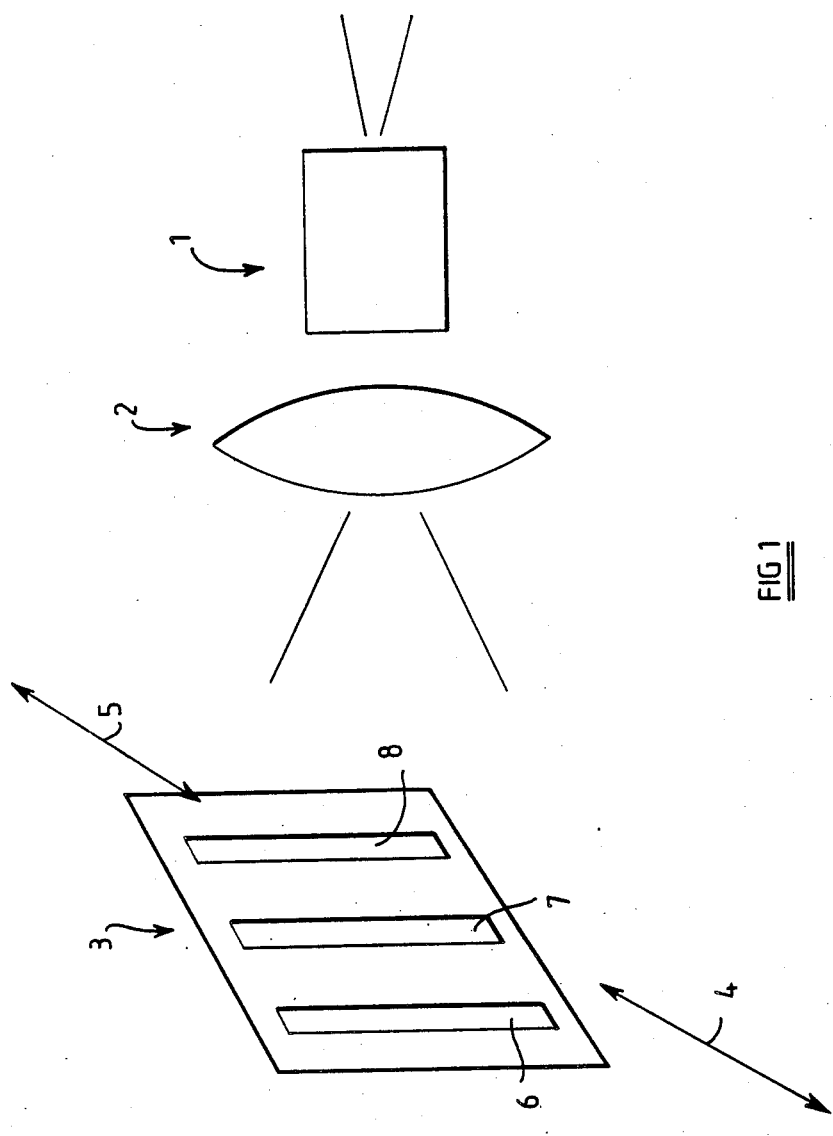
FIG. 1 is a diagrammatic simplified view of an optical system including a sensor chip with sensor elements to derive signals representative of an image.

Referring initially to FIG. 1 of the accompanying drawings an optical system includes an adjustable focussing device 1 and a lens system 2. FIG. 1 is purely a diagrammatic figure in this respect. The combination of the focussing device 1 and the lens system 2 is intended to focus an image in a plane (which is called "the focus plane") located in the region of a sensor array 3. The sensor array 3 is movable transversely in the direction shown by the arrows 4, 5 across said plane and thus the sensor array can be physically moved across the entire image. Whilst, in the presently described embodiment the sensor is caused to move relative to the image it is to be understood that in an alternative embodiment of the invention the image may be moved relative to the sensor.

The sensor consists of a single chip which has on it three arrays 6, 7, 8 of charge coupled devices, each array 6, 7, 8 comprising two staggered adjacent rows of charge coupled devices.

The chip carrying the arrays of charge coupled devices is located so that the charge coupled devices extend perpendicularly to the direction of movement of the chip as indicated by the arrows 4, 5. Also, the chip is tilted slightly relative to the focus plane so that a first array of charge coupled devices (array 8) is slightly in front of the focus plane and a second array, 6, is located slightly behind the focus plane. The angle of tilt is about 15°. The central array 7 actually lies on the focus plane.

As the chip is physically moved in the direction of the arrows 4, 5, each array of charge coupled devices will "see" the same "scan line" of the image in turn. However, when the optical system is in the correct focus only the array 7 of the charge coupled devices will have the image to be viewed perfectly focussed upon it, and the arrays 6 and 8 will both "see" the image out of focus, the array 8 "seeing" the image in what can be termed under focus and the array 6 "seeing" the image in what can be termed over focus.

As will be described in greater detail hereinafter, when the array 8 first "sees" a scan line or other image area, information relating to the measured contrast in that scan line or image area is determined and stored. When the sensor 3 has been moved by such a distance relative to the image that the array 6 is then "seeing" the same scan line or image area corresponding information is derived from the array 6, that information is compared with the information that has been derived from the array 6, and stored. The comparison of the two items of information enables a focus correcting signal to be generated, which can be fed to the adjustable focussing device 1.

Figure 2:
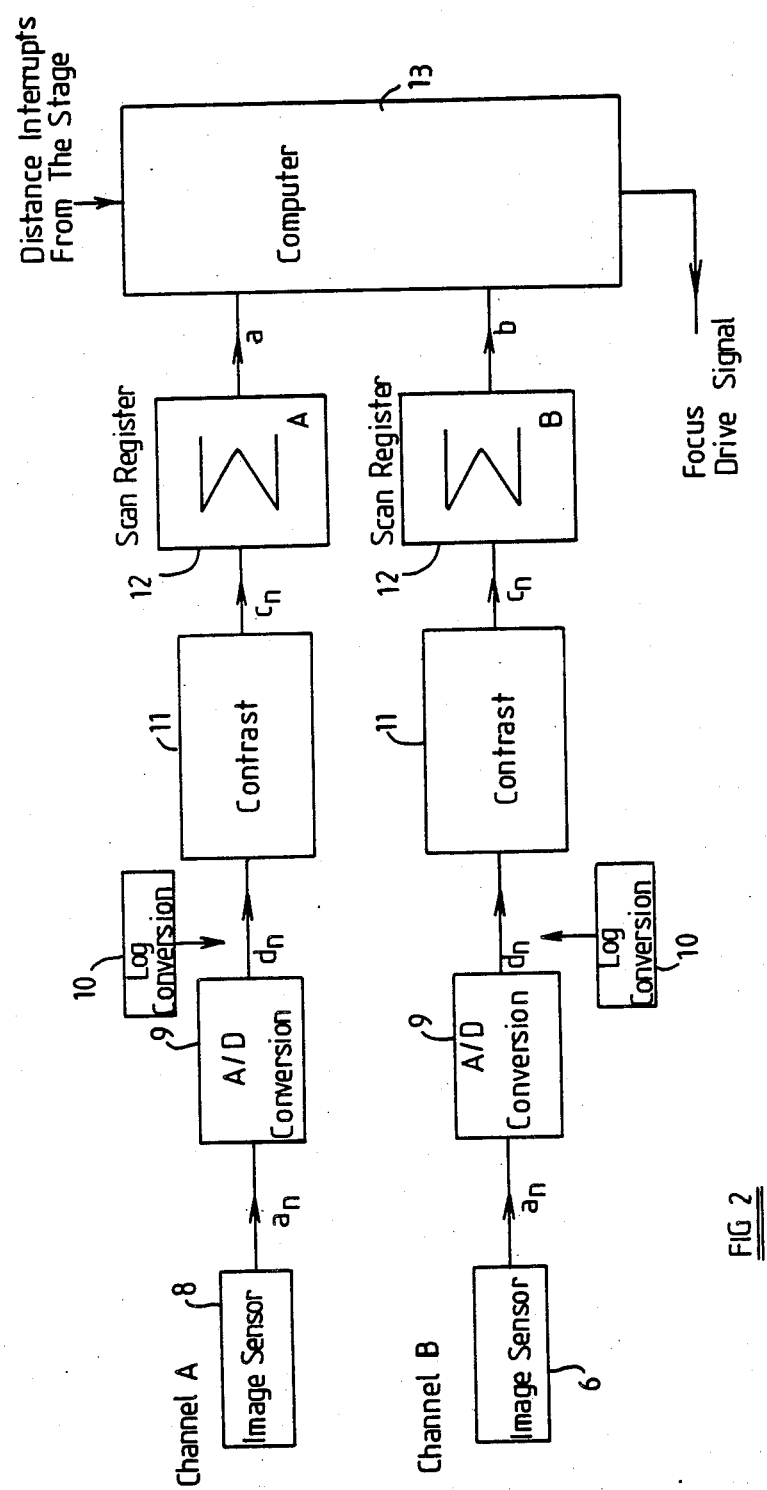
FIG. 2 is a block diagrammatic view of an arrangement in accordance with the invention.

Turning now to FIG. 2 of the accompanying drawings it can be seen that two channels are illustrated, namely channel A and channel B. The channel A commences with the image sensor 8 which consists of the above-described "first array" of charge coupled devices, and channel B commences with image sensor 6 which is the "second array" of charge coupled devices mentioned above. In a typical embodiment of the invention the distance in the direction of intended movement of the sensor (as indicated by the arrows 4, 5) between the image sensors 6 and 8 is approximately 280 microns. By virtue of the angle of tilt of the chip the two image sensors are displaced in focus by about 3 microns from each other. Thus the sensor 8 is 1.5 microns in front of the focus plane, and the sensor 6 is 1.5 microns behind the focus plane.

It is to be appreciated that the output of each image sensor, which is constituted by an array of charge coupled devices is a series of analog signals each representing the light intensity falling on a respective one of the charge coupled devices, i.e. on a respective pixel of the image. Each channel includes an analog to digital converter 9 which converts the analog output from the linear image sensor to an 8-bit digital value.

After the signal has passed through the analog to digital converter 9, the signal is subjected to a logarithmic conversion 10. The signal is thus converted from a signal representing a measured light level to a signal representing a nominal optical density. This conversion is not thought to be strictly necessary, but it is believed that this will help reduce the variation in the contrast measured with variatiins in the overall light level.

Next there is a digital measure of contrast. This depends on the difference in density of adjacent pixels, or in another words the difference in the light intensity as measured by adjacent charge coupled devices within the image sensor charge coupled device array. This gives a measure of the high frequency image content.

In one embodiment the signals derived from next adjacent pixels or next adjacent charge coupled devices are subtracted. Such an arrangement is used rather than taking the difference between immediately adjacent pixels or immediately adjacent charge coupled devices because one particular charge coupled device array that may be utilised has separate channels for "Odd" and "Even" pixels and thus the arrangement that we propose to utilise is facilitated.

The differences between the signals derived from next adjacent pixels are thus determined. The contrast measure may be determined by subtracting a constant value from the difference. All values that are not positive are then deemed to be zero. The resultant values may be raised to a power of, for example, 1.5 and multiplied by a further constant to provide a contrast value for each of the next adjacent pairs of pixels.

The contrast values, when determined in blocks 11 are passed to scan registers 12 where they are stored and summed, and the summed values are then passed to a computer 13.

The contrast signals in each scan register would accummulate for ever, and eventually overflow unless specific steps were taken to avoid this happening. Consequently the signals present in this scan register are read out at regular intervals, triggered whenever the sensor assembly 3 has been physically moved to a predetermined distance. In one embodiment this distance is set to be 70 microns, since it is most conveniently a sub-multiple of the array separation. Thus, after four interrupts (i.e. four separate steplike movements of the sensor) the array 6 is scanning the same image as array 8, if the array 8 is leading, and vice-versa in the opposite scan direction.

Each sample of signals taken from the scan registers represents the integrated contrast measure of the area defined by the width of the scan line (e.g. 1024 microns) and the distance travelled by the sensor since the previous reading (70 microns). It is thus possible to compare the contrast measure readings of channel A and channel B for the same area by using a shift register, or cyclic buffer, in the computer to hold one set of samples for four interrupts before comparison is effected.

It will be noted that this particular system first responds to the contribution of the focus area of a particular charge coupled device at the beginning of the sample area after delay of 70+280=350 microns.

It is to be appreciated that the computer is provided with signals indicating each distance interrupt of movement of the sensor 3, and the computer provides an output which is a focus drive signal.

The described embodiment may be simplified or improved to a certain extent if the charge coupled device arrays each consist of staggered rows of charge coupled devices, and if only the "Even" devices are used from channel A and only the "Odd" devices are used from channel B, since it is then possible to utilise exactly the same analog to digital converter, logarithmic converter and contrast calculator for the two channels. This obviates any risk of lack of balance between the two channels which is an advantage, since it will be understood that lack of balance between the two channels can contribute to poor focus.

Figure 3A:
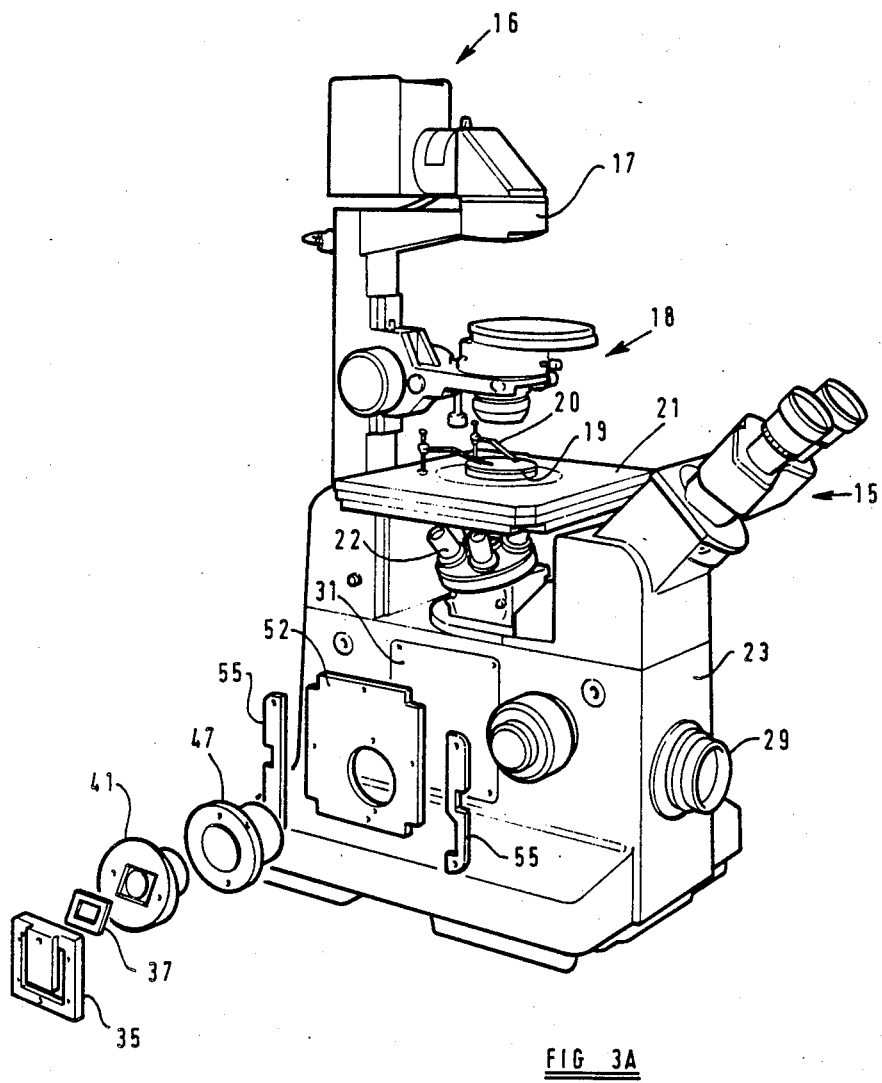
FIG. 3A is a perspective view of a microscope provided with a focussing system in accordance with the invention, part of the microscope being exploded.
Figure 3B:
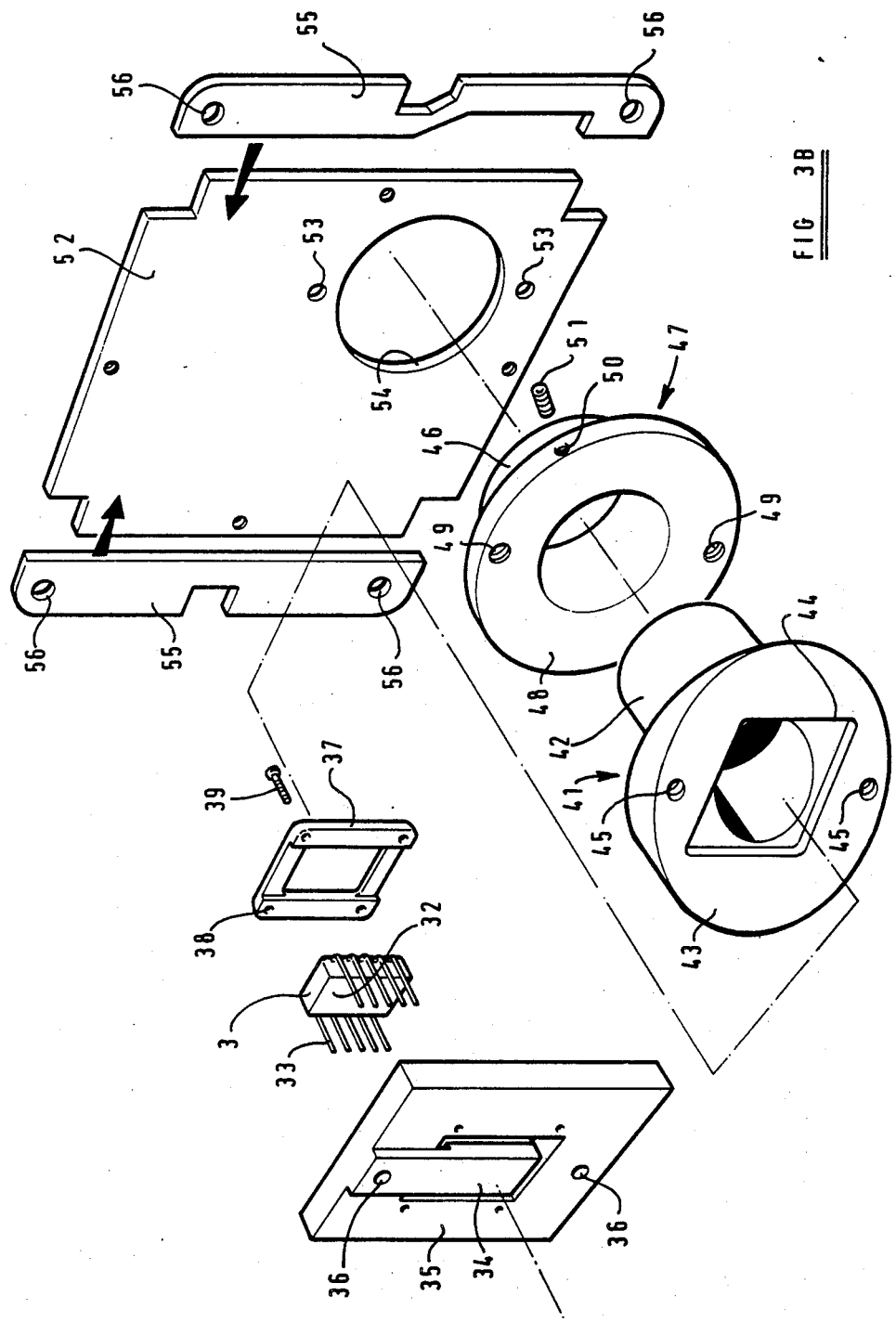
FIG. 3B shows part of FIG. 3A to an enlarged scale.
Figure 4:
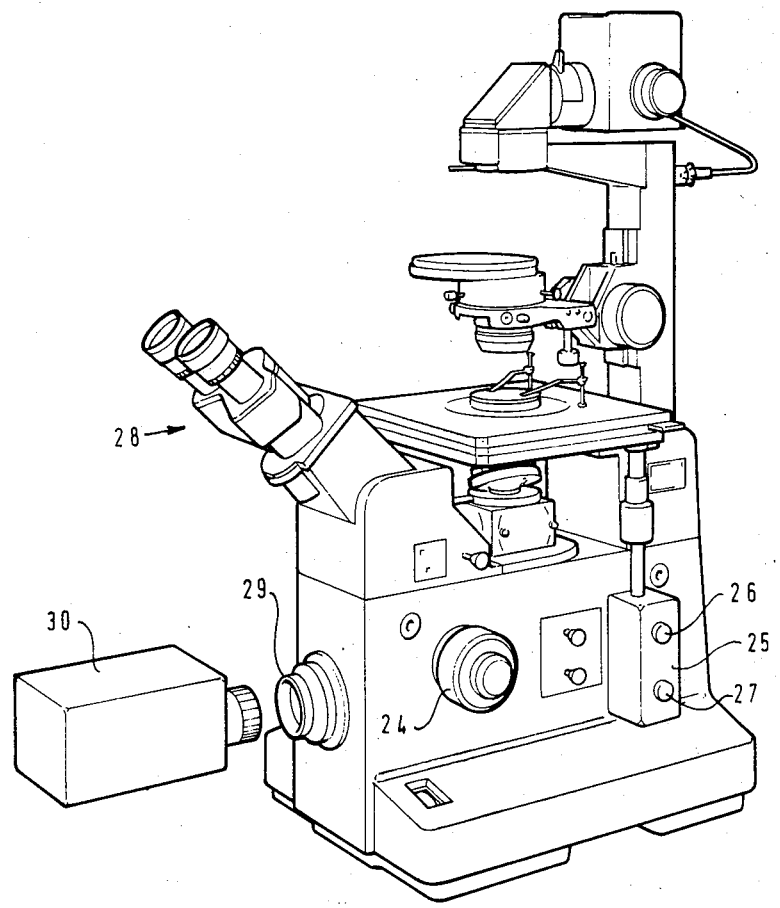
FIG. 4 is a perspective view of the other side of the microscope.

FIGS. 3 and 4 illustrates a microscope provided with a focussing system in accordance with the invention.

The microscope 15 is a conventional design and is provided with a lamp housing 16 containing a lamp which directs light, from a lamp within the housing, through a diaphragm 17, towards a condensor assembly 18. The light then passes through a specimen 19 retained by specimen clips 20 on a movable specimen stage plate 21. The light then passes through an objective lens present on a revolving nosepiece 22 and then passes into an optical system contained within a supporting housing 23. A focussing control 24 is provided to enable the optical system to be manually focussed if desired, but, as will be described, the microscope is provided with an automatic focussing system in accordance with the invention.

The movable stage plate is driven by means of a motor contained within a motor housing 25. The motor may be manually controlled by means of appropriate knobs or switches 26, 27 to control manually movement of the specimen stage plate in the "X" and "Y" directions. The motor may also be controlled automatically.

The microscope is provided with three optical outputs. Thus the beam within the microscope is passed through a beam splitter and three beams are created each with its own focus plane. Each optical output is coaligned with a respective focus plane. The first output is connected to a binocular eyepiece tube 28 to enable an image of the specimen to be viewed by eye. A second output 29 is in the form of a camera port adapted to be connected to a camera 30 or other image sensing device, such as an array of charge coupled devices, to enable the image of the specimen to be "viewed" electronically.

The third port, 31, is operatively connected to a sensor 3 in accordance with the present invention. As can be seen the sensor 3 is formed on the front face of an integrated circuit 32 having rearwardly extending legs 33 which lie on either side of a metal strip 34 which is in contact with the undersurface of the integrated circuit 32 and thus constitutes a heat sink for the sensor. The metal strip 34 is formed integrally with and extends partly across the centre of a square frame 35 provided with two screw holes 36. A smaller square frame 37, with holes 38 at the corners thereof is secured by means of screws 39 to the front face of the frame 35 and facilitates the location of the frame 35, and the sensor 3, on an inclined face 40 of a sensor carrier 41. The sensor carrier 41 has a tubular spigot 42 which carries a transverse head 43, the end face of which 40 is inclined at an angle of approximatley 15° to the axis defined by the spigot 42. A square recess 44 is formed in the inclined face 40 which is dimensioned to receive the frame 37. The face 40 is also provided with two internally threaded bores 45 adapted to receive screws passing through the screw holes 36 formed in the frame 35. The frame 35 is thus located in position with the frame 37 received snugly within the square recess 44, and screws are then passed through the screw holes 36 into the internally threaded bores 45 to secure the frame 35 in position, and thus to secure the sensor 3 in position. The sensor 3 is thus secured in position with the front face thereof, which carries the sensor array described above, inclined at an angle of 15° to the axis of the spigot 42. The spigot 42 is, of course, hollow to permit a beam of light to pass up the spigot and fall onto the sensor 3.

The spigot 42 of the sensor carrier 41 is received within a further tubular spigot 46 of a holding assembly 47. The holding assembly 47 consists of a tubular spigot 46 and a transverse circular head 48 provided with two axially extending diammetrically opposed apertures 49 and a radially extending aperture 50 which receives a grub screw 51. The spigot 42 may be inserted into the hollow interior of the spigot 46 and when the sensor carrier 41 has been rotated to a desired position the grub screw 51 may be tightened.

The holding assembly 47 may be secured to a mounting plate 52 by means of screws passing through the apertures 49 in the circular head 48 of the assembly, these screws being received in screw threaded apertures 53 formed in the plate 52. The apertures 53 lie on diametrically opposed sides of a relatively large aperture 54 dimensioned to receive the spigot 46. The plate 52 may be secured to the body of the microscope by means of mounting strips 55 provided with apertures 56 to receive screws which can be received in appropriate screw threaded bores provided within the housing 23 of the microscope.

It will be appreciated that when the sensor has been mounted in position in the manner described the sensor carrier assembly 41 may be rotated so that the various sensor arrays provided on the sensor 3 lie in the desired position. Of couorse, the various components will be designed so that when installed in the manner described the focus plane will lie on the central sensor array provided on the sensor 3.

In this embodiment of the invention, instead of the sensor being moved relative to the image to effect the scanning process described above, the image is moved relative to the sensor. This is achieved by actually moving the specimen by means of a motor contained within the motor housing 25. The motor is thus controlled automatically to effect the desired stepping movement of the specimen whilst the focussing of the arrangment is automatically accomplished. The focussed image may then be viewed through the binocular eyepiece 28 or the specimen may be "viewed" by the camera or other sensor 30.

It is to be understood that the focussing system of the invention may find various other applications in the focussing of projectors, camera or other optical devices where images have to be brought into focus.

What is claimed is:

1. An automatic focussing arrangement, incorporated in a system which an optical image is focussed on to a focus plane, comprising a sensor assembly, located in the region of the focus plane to sense the image, the sensor assembly comprising at least two arrays of sensor devices, one array of sensor devices being in front of the focus plane, and the second array of sensor devices being behind the focus plane, means being provided for effecting relative movement between the image and the sensor assembly, so that the sensor assembly may be sequentially exposed directly to different parts of the image, means being provided for deriving from the first and second array signals representative of the image received by the said sensor devices, and for deriving, from signals generated from the first array when exposed to a predetermined part of the image, and from the second array when exposed to the predetermined part of the image, a focus drive signal to maintain the focus of the arrangement as desired.

2. An arrangement according to claim 1, wherein a further sensor arrangement is provided, which is located in a focus plane, to sense the focussed image.

3. An arrangement according to claim 1, wherein the arrays of sensor devices are all mounted on a single substrate which is tilted relative to said plane, the first and second arrays being located in regions of the substrate that are in front of and behind said focus plane respectively.

4. An arrangement according to claim 3, wherein the arrays all form part of a single "chip" of arrays, each array comprising an array of charge coupled devices.

5. An arrangement according to claim 1, wherein the arrays are elongate arrays and the relative movement between the sensor assembly and said image in said focus plane is in a direction transverse to the longitudinal axes of said arrays.

6. An arrangement according to claim 5, wherein the arrangement further comprises means for deriving a signal representative of the contrast of part of the image as viewed by one of the first and second array, means for storing the information at least until such time that the other of said arrays respectively senses the same part of the image, and means for comparing the information from the said arrays to derive said focus drive signal.

7. An arrangement according to claim 1, wherein the first and second sensor arrays each consist of a plurality of sensing elements adapted to provide output signals representative of the levels of light intensity received by adjacent or next adjacent sensing elements, said deriving means including means to calculate the difference between signals from said first and second arrays to provide a signal representative contrast.

8. An arrangement according to claim 7, wherein all calculated differences less than a predetermined value are deemed to be zero, and all remaining differences have said predetermined value subtracted therefrom, the contrast representing signal being calculated as a function of the remaining value.

9. An arrangement according to claim 1, wherein each of the first and second sensor arrays comprises two staggered rows of light sensitive devices, means being provided to transfer signals from one of the rows of said first array to processing circuitry and to transfer signals from the other of the rows of the second array to the processing circuitry, thus enabling the same processing circuitry to be utilized for the first and second array.

10. An automatic focussing arrangement, incorporated in a system in which an optical image is focussed on to a focus plane, comprising a sensor assembly located in the region of the focus plane to sense the image, the sensor assembly comprising at least two arrays of sensor devices, one array of sensor devices being in front of the focus plane, and the second array of sensor devices being behind the focus plane, means being provided for effecting relative movement between the image and the sensor assembly, means being provided for deriving from the first and second arrays of signals representative of the image received by the sensor devices, the signals being representative of the levels of light intensity received by adjacent or next adjacent sensing elements in each array, and means being provided for deriving, from those signals, a focus drive signal to maintain the focus of the arrangement as desired, the focus drive signal deriving means comprising means to effect a logarithmic conversion of each signal, and means to effect an analogue to digital conversion of each signal, and means to further process the signal.

11. An automatic focussing arrangement according to claim 10 wherein the means to derive the focus drive signal comprise means to effect a logarithmic conversion and an analogue to digital conversion of the signal from each sensor present image sensor array, means for calculating the difference between signals from adjacent or next adjacent sensors of each array, means for selecting those signals above a predetermined threshold and for further processing those signals in excess of the threshold.

12. An automatic focussing arrangement according to claim 11 wherein said further processing means include means for raising the signals that pass said threshold by a predetermined power and by multiplying the resultant signal by a constant.

13. An automatic focussing arrangement according to claim 12 wherein the multiplied signals are summed, and the summed signal derived from each of said two sensor arrays as that sensor array is exposed to the same predetermined part of the image are compared to generate the focus drive signal.

* * * * *